United States Patent
Sjoeroos et al.

(10) Patent No.: US 11,838,714 B1
(45) Date of Patent: Dec. 5, 2023

(54) PARALLEL WIRELESS CHARGING FOR ELECTRONIC DEVICES

(71) Applicant: Apple Inc., Cupertino, CA (US)

(72) Inventors: Jukka-pekka J. Sjoeroos, Cupertino, CA (US); Zaki Moussaoui, San Carlos, CA (US)

(73) Assignee: Apple Inc., Cupertino, CA (US)

(*) Notice: Subject to any disclaimer, the term of this patent is extended or adjusted under 35 U.S.C. 154(b) by 429 days.

(21) Appl. No.: 17/027,699

(22) Filed: Sep. 21, 2020

Related U.S. Application Data (60) Provisional application No. 62/903,248, filed on Sep. 20, 2019.

(51) Int. Cl.
| | |
|---|---|
| *H04R 1/10* | (2006.01) |
| *H02J 50/00* | (2016.01) |
| *H02J 50/70* | (2016.01) |
| *H02J 50/10* | (2016.01) |

(52) U.S. Cl.
CPC .......... *H04R 1/1025* (2013.01); *H02J 50/005* (2020.01); *H02J 50/10* (2016.02); *H02J 50/70* (2016.02); *H04R 1/1016* (2013.01); *H02J 2310/23* (2020.01)

(58) Field of Classification Search
CPC ...... H04R 1/1025; H02J 50/005; H02J 50/70; H02J 50/10
USPC ................................................ 320/108, 115
See application file for complete search history.

(56) References Cited

U.S. PATENT DOCUMENTS

| | | | |
|---|---|---|---|
| 9,210,498 B1* | 12/2015 | Shaffer | H02J 50/90 |
| 2015/0245126 A1* | 8/2015 | Shaffer | H04R 1/1025 |
| | | | 381/74 |
| 2016/0134959 A1* | 5/2016 | Shaffer | H04R 1/1025 |
| | | | 381/74 |
| 2016/0134961 A1* | 5/2016 | Shaffer | H04R 1/105 |
| | | | 381/74 |
| 2017/0094399 A1* | 3/2017 | Chandramohan | H04B 5/0037 |
| 2018/0064224 A1* | 3/2018 | Brzezinski | A45C 13/02 |
| 2018/0091884 A1* | 3/2018 | Minoo | H02J 7/0042 |
| 2018/0091887 A1* | 3/2018 | Minoo | H04R 1/1025 |

* cited by examiner

*Primary Examiner* — Richard V Muralidar
(74) *Attorney, Agent, or Firm* — KILPATRICK TOWNSEND AND STOCKTON, LLP (57) ABSTRACT

Electronic apparatuses according to embodiments of the present technology may include an enclosure having a lid. The enclosure may define a first cavity and a second cavity, and may include an enclosure battery. The apparatuses may include a first enclosure wireless charging coil extending about the first cavity. The apparatuses may include a second enclosure wireless charging coil extending about the second cavity. The apparatuses may include a first earbud having a first earbud battery and a first earbud wireless charging coil operably coupleable with the first enclosure wireless charging coil for wireless charging of the first earbud battery. The apparatuses may include a second earbud having a second earbud battery and a second earbud wireless charging coil operably coupleable with the second enclosure wireless charging coil for wireless charging of the second earbud battery.

20 Claims, 4 Drawing Sheets

PARALLEL WIRELESS CHARGING FOR ELECTRONIC DEVICES

CROSS-REFERENCES TO RELATED APPLICATIONS

The present application claims the benefit of and priority to U.S. Provisional Application No. 62/903,248, filed Sep. 20, 2019, the contents of which are hereby incorporated by reference in their entirety for all purposes.

TECHNICAL FIELD

The present technology relates to wireless charging systems. More specifically, the present technology relates to wireless charging system configurations, components, and characteristics.

BACKGROUND

Wireless charging is useful for a variety of devices. As electronic devices in which wireless charging components are housed reduce in size, the available space for materials may be limited, which may affect operational performance.

SUMMARY

Electronic apparatuses according to embodiments of the present technology may include an enclosure having a lid. The enclosure may define a first cavity and a second cavity within the enclosure, and the enclosure may include an enclosure battery. The apparatuses may include a first enclosure wireless charging coil incorporated within the enclosure and extending about the first cavity. The apparatuses may include a second enclosure wireless charging coil incorporated within the enclosure and extending about the second cavity. The apparatuses may include a first earbud positionable within the first cavity of the enclosure. The first earbud may include a first earbud battery and a first earbud wireless charging coil operably coupleable with the first enclosure wireless charging coil for wireless charging of the first earbud battery. The apparatuses may include a second earbud positionable within the second cavity of the enclosure. The second earbud may include a second earbud battery and a second earbud wireless charging coil operably coupleable with the second enclosure wireless charging coil for wireless charging of the second earbud battery In some embodiments, the first enclosure wireless charging coil and the second enclosure wireless charging coil may be switchable between a first operational mode of wireless power reception, and a second operational mode of wireless power transmission. The first earbud may be characterized by a profile having a substantially cylindrical portion within which the first earbud battery is disposed. The first earbud wireless charging coil may extend concentrically about the first earbud battery. The second earbud may be characterized by a profile having a substantially cylindrical portion within which the second earbud battery may be disposed. The second earbud wireless charging coil may extend concentrically about the second earbud battery. The apparatuses may also include a first magnetic conductor positioned between the first earbud battery and the first earbud wireless charging coil. The apparatuses may also include a second magnetic conductor positioned between the second earbud battery and the second earbud wireless charging coil.

The first earbud may be positioned within the first cavity of the enclosure. The first enclosure wireless charging coil may extend concentrically about the first earbud wireless charging coil. The apparatuses may include a first electromagnetic interference ("EMI") shield within the enclosure and at least partially extending about the first enclosure wireless charging coil. The apparatuses may include a second EMI shield within the enclosure and at least partially extending about the second enclosure wireless charging coil.

Some embodiments of the present technology may encompass wireless charging systems. The systems may include a wireless charger including a charger wireless charging coil. The systems may include an electronic apparatus including an enclosure defining a first cavity and a second cavity within the enclosure. The enclosure may include an enclosure battery. The electronic apparatus may include a first enclosure wireless charging coil incorporated within the enclosure and extending about the first cavity. The enclosure may include a second enclosure wireless charging coil incorporated within the enclosure and extending about the second cavity. The first enclosure wireless charging coil and the second enclosure wireless charging coil are electrically coupled with the enclosure battery. The electronic apparatus may include a first earbud positionable within the first cavity of the enclosure. The first earbud may include a first earbud battery and a first earbud wireless charging coil operably coupleable with the first enclosure wireless charging coil for wireless charging. The electronic apparatus may include a second earbud positionable within the second cavity of the enclosure. The second earbud may include a second earbud battery and a second earbud wireless charging coil operably coupleable with the second enclosure wireless charging coil for wireless charging.

In some embodiments, the wireless charger may include four charger wireless charging coils positioned about a central axis of the wireless charger. A first charger wireless charging coil and a second charger wireless charging coil may be configured to transmit wireless power in 180° phase shift from one another. When seated on the wireless charger, the enclosure may produce an alignment positioning the first enclosure wireless charging coil and the first earbud across a first charger wireless charging coil and a second wireless charging coil, and positioning the second enclosure wireless charging coil and the second earbud across a third charger wireless charging coil and a fourth wireless charging coil. The wireless charger may include a magnet, the enclosure may include a magnet, and the magnet of the wireless charger and the magnet of the enclosure may cooperate to provide the alignment. The wireless charger may be operable to transmit wireless power receivable by the first enclosure wireless charging coil, the second enclosure wireless charging coil, the first earbud wireless charging coil, and the second earbud wireless charging coil.

The first enclosure wireless charging coil and the second enclosure wireless charging coil may be switchable between a first operational mode of wireless power reception, and a second operational mode of wireless power transmission. The first earbud may be characterized by a profile having a substantially cylindrical portion within which the first earbud battery is disposed. The first earbud wireless charging coil may extend concentrically about the first earbud battery. The second earbud may be characterized by a profile having a substantially cylindrical portion within which the second earbud battery is disposed. The second earbud wireless charging coil may extend concentrically about the second earbud battery. The systems may include a first magnetic conductor positioned between the first earbud battery and the first earbud wireless charging coil. The systems may include a second magnetic conductor positioned between the second earbud battery and the second earbud wireless charging coil. The first earbud may be positioned within the first cavity of the enclosure, and the first enclosure wireless charging coil may extend concentrically about the first earbud wireless charging coil. The systems may include a first electromagnetic interference ("EMI") shield within the enclosure and at least partially extending about the first enclosure wireless charging coil. The systems may include a second EMI shield within the enclosure and at least partially extending about the second enclosure wireless charging coil.

Some embodiments of the present technology may encompass electronic apparatuses. The apparatuses may include an enclosure defining a first cavity and a second cavity within the enclosure. The enclosure may include an enclosure battery. The apparatuses may include an enclosure wireless charging coil incorporated within the enclosure and extending about the first cavity. The enclosure wireless charging coil may be electrically coupled with the enclosure battery. The apparatuses may include a first earbud positionable within the first cavity of the enclosure. The first earbud may include a first earbud battery. The apparatuses may include a first earbud wireless charging coil extending concentrically about the first earbud battery. The first earbud wireless charging coil may be operably coupleable with the enclosure wireless charging coil for wireless charging. The apparatuses may include a second earbud positionable within the second cavity of the enclosure. The second earbud may include a second earbud battery and a second earbud wireless charging coil.

In some embodiments, the enclosure wireless charging coil may be switchable between a first operational mode of wireless power reception, and a second operational mode of wireless power transmission. The apparatuses may include a first magnetic conductor axially aligned with and positioned between the first earbud battery and the first earbud wireless charging coil. The apparatuses may include a second magnetic conductor axially aligned with and positioned between the second earbud battery and the second earbud wireless charging coil.

Such technology may provide numerous benefits over conventional technology. For example, the present systems may produce improved charging efficiency, which may reduce charging times. Additionally, components and configurations of the present technology may provide parallel charging of components and a powered enclosure. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Wireless charging is a convenient feature for handheld products and personal devices. By incorporating charging coils in transmission and receiver devices, inductive charging can be performed. The process of wireless charging can have challenges including charging efficiency, which can impact performance and the time to charge the devices. For example, during the charging process, magnetic flux is emitted from both the transmission coil and the receiver coil. In many systems, ferrite or some magnetic material is utilized to facilitate conduction of the flux to improve efficiency of distribution and collection. The ferrite provides this function by conducting the flux and directing it back towards an appropriate coil or coils.

Additionally, charging systems can be limited when operating at reduced power. For example, some conventional charging systems may include a battery in a case or enclosure, which may be used to charge batteries in the devices. These batteries may operate in series where charging systems, whether wired or wireless, may pass through the case battery to begin charging the end device in an attempt to limit the time before the device may be used. However, when the case battery is at reduced charge, or substantially depleted, a voltage booster may be incorporated to provide sufficient voltage to the end device. These additional components may reduce overall charging efficiency, which may increase charging time. The present technology overcomes many of these issues by providing parallel charging to both an enclosure battery and a device battery, which may increase the charging efficiency to both batteries. Additionally, the configuration of systems according to some embodiments of the present technology may improve coupling coefficients, which may reduce circuitry or electrical components within the system.

Although the remaining portions of the description will routinely reference earbuds or portable listening devices, it will be readily understood by the skilled artisan that the technology is not so limited. The present materials and technology may be employed with any number of electronic devices that may include, without limitation, phones and mobile devices, watches, glasses, and other wearable technology including fitness devices, handheld electronic devices, laptops, tablets, and other computers, as well as other devices that may benefit from the use of wireless charging technology. For example, any number of devices having multiple batteries may benefit from the parallel charging capabilities discussed throughout the present disclosure. It is also to be understood that portable listening devices may include any portable device designed to play sound that can be heard by a user. For example, headphones are one type of portable listening device, and portable speakers are another. Headphones may represent a pair of small, portable listening devices that are designed to be worn on or around the head of a user, and which may convert an electrical signal to a corresponding sound that can be heard by the user.

Headphones according to some embodiments of the present technology may include traditional headphones worn by a user, and which may include left and right listening devices connected to one another by a headband, headsets incorporating a microphone, and earbuds designed to be fitted directly within the ear. Headphones may include both over-ear headphones having earbuds that fully encompass the ears, and on-ear headphones having earbuds that press against the ear instead of surrounding the ear. It is to be understood that earbuds according to some embodiments of the present technology may include both headphones that fit within or on the outer ear facing the ear canal, and in-ear headphones that are inserted in the ear canal itself. Accordingly, the description and figures are not intended to limit the style or configuration of earbuds encompassed by the present technology.

Figure 1:
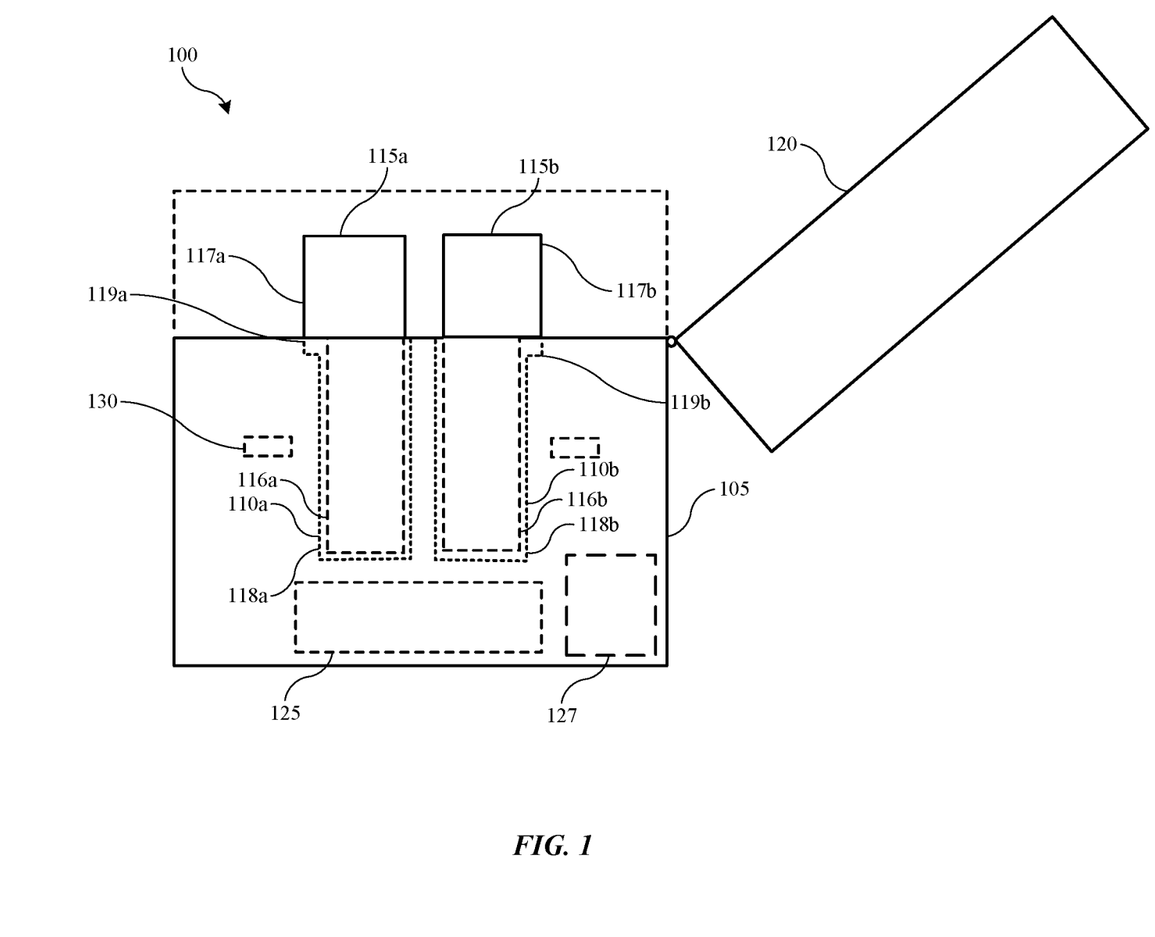
FIG. 1 shows a schematic perspective view of an electronic apparatus according to some embodiments of the present technology.

FIG. 1 shows a simplified plan view of an electronic apparatus 100 including a pair of wireless earbuds according to some embodiments of the present technology. As shown in FIG. 1, apparatus 100 may include an enclosure 105 defining one or more cavities 110, which may seat the earbuds. As illustrated, enclosure 105 may define multiple cavities including cavity 110a and cavity 110b configured to receive a pair of earbuds 115, such as earbud 115a and earbud 115b. In some embodiments, cavities 110 can be positioned adjacent one another within the enclosure 105, and may be isolated cavities as illustrated as well as at least partially joined in some embodiments. Each cavity 110 can be sized and shaped to match that of its respective earbud 115. Although any profile or configuration of earbuds may be encompassed by the present technology, in some embodiments earbuds 115 may include a stem 116 and a bud 117. Cavities 110 may at least partially accommodate this profile, and may define a substantially cylindrical portion of the cavity to receive the stem 116 as well as a pocket or cup portion to at least partially receive or seat the bud 117.

As illustrated, first earbud 115a may be positionable within first cavity 110a, where stem 116a may be housed in cylindrical portion 118a, and bud 117a may be at least partially seated in cup portion 119a. Similarly, second earbud 115b may be positioneable within second cavity 110b, where stem 116b may be housed in cylindrical portion 118b, and bud 117b may be at least partially seated in cup portion 119b. In some embodiments, stem 116 may be an elongated portion of the ear bud, and may be substantially cylindrical. By substantially is meant a generally cylindrical shape, although the profile of stem 116 may be rounded or modified for functional or aesthetic purposes. A battery may be positioned within stem 116 as will be discussed further below, and wireless charging materials may similarly be included within the apparatus near the stem of the earbuds and the cylindrical portion of the cavities. While the cylindrical portions 118 may be similar between the two cavities, cup portions 119 may extend outwardly from one another, which may limit interaction between the earbuds, and may produce a specified cavity arrangement for each earbud.

Electronic apparatus 100 may also include a lid 120 as part of enclosure 105, which may operate on a hinge as illustrated, or may be otherwise connected with the enclosure. Lid 120 may be operable between a closed position where lid 120 is aligned over one or more cavities 110 fully enclosing earbuds 115 within the housing, and an open position where the lid is displaced from the housing and cavities. In some embodiments, lid 120 may at least partially define the cup portion 119 of the cavities 110, to fully enclose earbuds 115 when the lid is in the closed position for enclosure 105. In some embodiments, enclosure 105 may also include a battery 125 configured to charge earbuds 115, as well as electronic components 127 and circuitry, which may provide any number of features or controls as will be described further below. One or more magnets 130 may also be incorporated within the enclosure, and may be configured to orient and retain the earbuds within the cavities 110. Additional or alternative features are similarly encompassed by the present technology, and FIG. 1 is to be understood as illustrating one possible system configuration encompassed by embodiments of the present technology, although it is not intended to limit the technology to any particular configuration.

Figure 2:
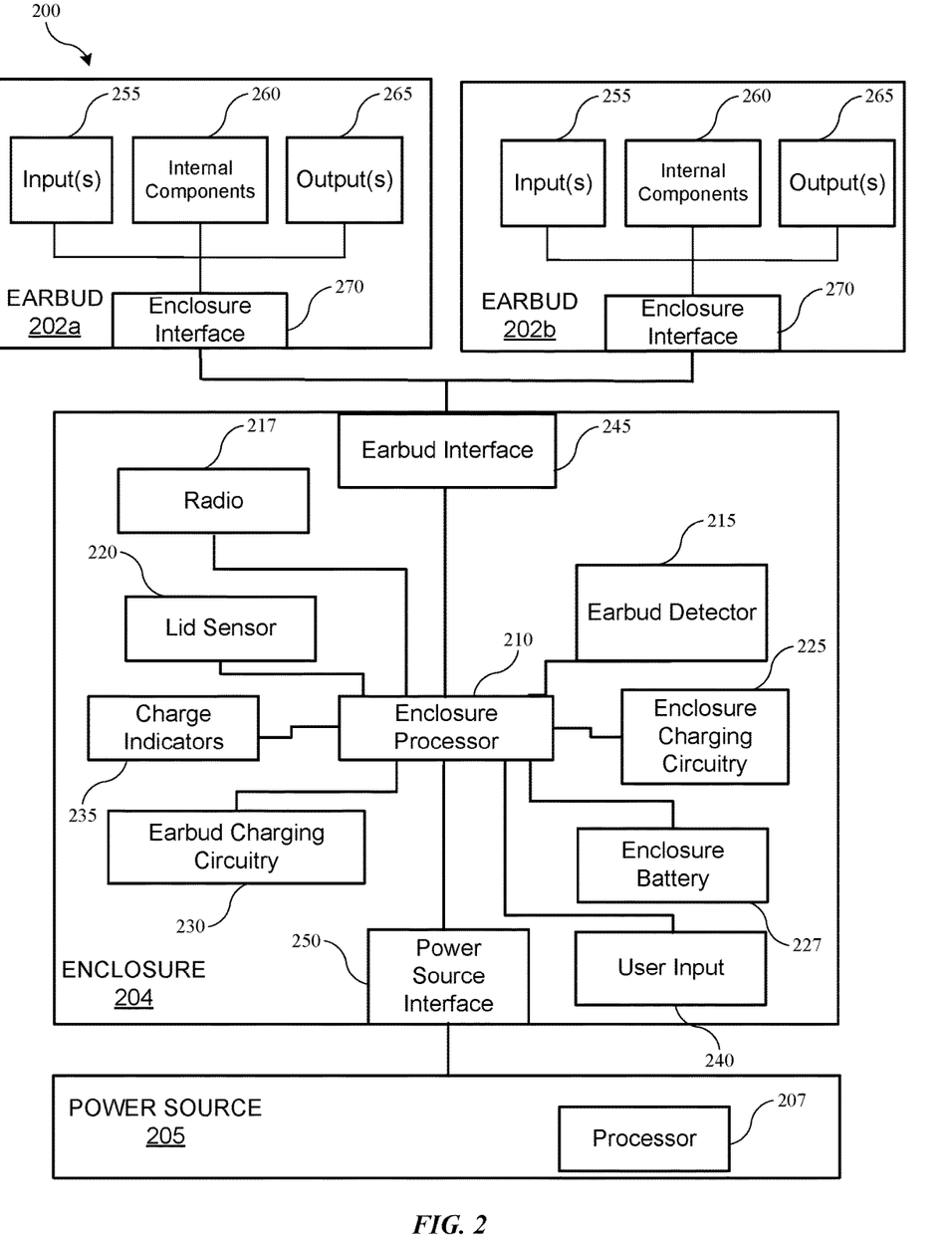
FIG. 2 shows a schematic block diagram of a wireless charging system according to some embodiments of the present technology.

FIG. 2 illustrates a simplified block diagram of a wireless charging system 200 according to some embodiments of the present technology. System 200 may be a block diagram including the components or devices of apparatus 100 described above, and may include any of the components or features noted above. For example, wireless charging system 200 may include earbuds 202a and 202b, an enclosure 204 configured to house and/or charge the earbuds as noted above, and a power source 205 for charging the enclosure. The power source 205 may be a wired connection in some embodiments, such as from mains power, as well as any type of charging platform or device, including a wireless charger in some embodiments. Power source 205 may include a processor 207, which may facilitate operation of one or more wireless charging coils as will be described further below.

Each earbuds 202 may include one or more inputs 255, internal components 260, and one or more outputs 265. In some embodiments, the one or more inputs 255 may be or include a microphone input and one or more buttons or sensors that register contact from a user. For example, buttons, switches, or sensors, such as capacitive touch sensors, for example, may facilitate a number of interactions or controls including pairing with an external device, as well as controls or instructions for the earbuds or a paired device. Internal components 260 may include a speaker, a microphone, a rechargeable battery, a processor, wireless charging coils or components, and/or other circuitry and components. Outputs 265 may be audio from a speaker, a light, or other indicator, such as indicating pairing with a device, battery charge level, or other functionality of the earbuds. In some embodiments any of the inputs and/or outputs may include a wireless radio operable to provide and/or receive signals to or from a paired device. Additionally, in some embodiments, earbuds 202 may include an enclosure interface 270, which may provide coupling with the enclosure 204 in one or more ways. For example, interface 270 may be or include a contact connector operable to receive power or communication from the enclosure 204, and in some embodiments interface 270 may be one or more wireless charging coils that may wirelessly receive power from the enclosure and/or from a power source as will be described further below.

Enclosure 204 may include an enclosure processor 210, an earbud detector 215, radio 217, a lid sensor 220, enclosure charging circuitry 225, a battery 227, earbud charging circuitry 230, as well as any number of additional components or characteristics. Enclosure 204 may also include an earbud interface 245 that enables circuitry within enclosure 204 to communicate with and/or charge earbuds 202, and a power source interface 250 that may couple the enclosure with power source 205, such as an AC or DC power source or an inductive charging pad. Power source interface 250 may be part of a receptacle connector, and in some embodiments power interface 250 may be or include a wireless power receiver, such as one or more wireless power receiving coils, which can receive inductive power from power source 205. Earbud interface 245 may transfer power and/or data between enclosure 204 and the earbuds via enclosure interface 270 in each earbud. Earbud interface 245 may include an electrical connector, or may include a wireless power transmitter, such as a wireless power transmitting coil that can transmit inductive power to an inductive power receiver within the earbuds. As will be explained below, in some embodiments, earbud interface 245 and power source interface 250 may be the same components, such as one or more wireless charging coils, which may be controlled by enclosure processor 210 to receive and/or transmit wireless power.

Enclosure processor 210 may be configured to control various functions of enclosure 204. In some embodiments, earbud detector 215 includes one or more sensors that detect when one or both of earbuds 202 are placed within enclosure 204. In some embodiments, enclosure processor 210 may communicate with earbuds 202 by sending and receiving data through earbud interface 245 and enclosure interface 270 of either or both earbuds. Enclosure processor 210 may communicate with power source 205 by sending and receiving data through power source interface 250. That is, in various embodiments earbud interface 245 and power source interface 250 may be capable of carrying both power and data signals for single or bidirectional communication. In some embodiments, enclosure 204 may include a wireless radio 217 that enables the enclosure to transmit and receive data communications with earbuds 202 and a host device, such as or including a smartphone, a tablet computer, a laptop computer, or other devices in addition to, or instead of, relying on data exchange through interfaces 245 and 250. Lid sensor 220 may detect when a lid to the enclosure is in the open position and when the lid is in the closed position.

Enclosure battery 227 may provide power for the circuitry associated with enclosure 204 and may be a rechargeable battery that can be charged by power source 205 and enclosure charging circuitry 225 through power source interface 250. Enclosure battery 227 may also be coupled with earbud interface 245 and may charge earbuds 202 in conjunction with earbud charging circuitry 230. In some embodiments, earbud charging circuitry 230 may charge earbuds 202 anytime they are properly stored within cavities 110 even though enclosure 204 may not be coupled with power source 205. Enclosure processor 210 may additionally be coupled with enclosure charging circuitry 225, which may control the charging of enclosure battery 227, such as by controlling the voltage and current supplied to the battery to optimize the speed of charging and the life of the battery. As noted above, in some embodiments earbud interface 245 and power source interface 250 may be the same component, such as wireless charging coils switchable between receiving and transmission modes. Enclosure processor 210 may be configured to switch this combined interface between these modes. For example, when enclosure processor 210 determines that enclosure 204 is seated on a power source 205, the enclosure processor may switch the combined interface to a receiving mode. Additionally, when enclosure processor 210 determines that enclosure 204 is not positioned near a power source 205, the enclosure processor may switch the combined interface to a transmission mode to ensure earbuds 202 are receiving charging power.

Similarly, in some embodiments enclosure processor 210 may be coupled with earbud charging circuitry 230 to control battery charging for the earbuds 202. For example, enclosure processor 210 may control the voltage and current supplied to the batteries to optimize the speed of charging and the life of the batteries through earbud interface 245. Enclosure 204 may include one or more charge indicators 235 that may indicate a charge level of enclosure battery 227 and/or the pair of earbud batteries such that a user may see the indicators on an outer surface of enclosure. In some embodiments enclosure 204 may also include one or more user input devices 240. Each included input device 240 may be a button or other type of input that, in response to being activated by or otherwise receiving input from a user, generates a signal that may be communicated to processor 210 or other circuitry within enclosure 204. Any number of other components and configurations may also be incorporated within enclosure 204 or earbuds 202, and are similarly encompassed by the present technology.

Figures 3A, 3B, 4:
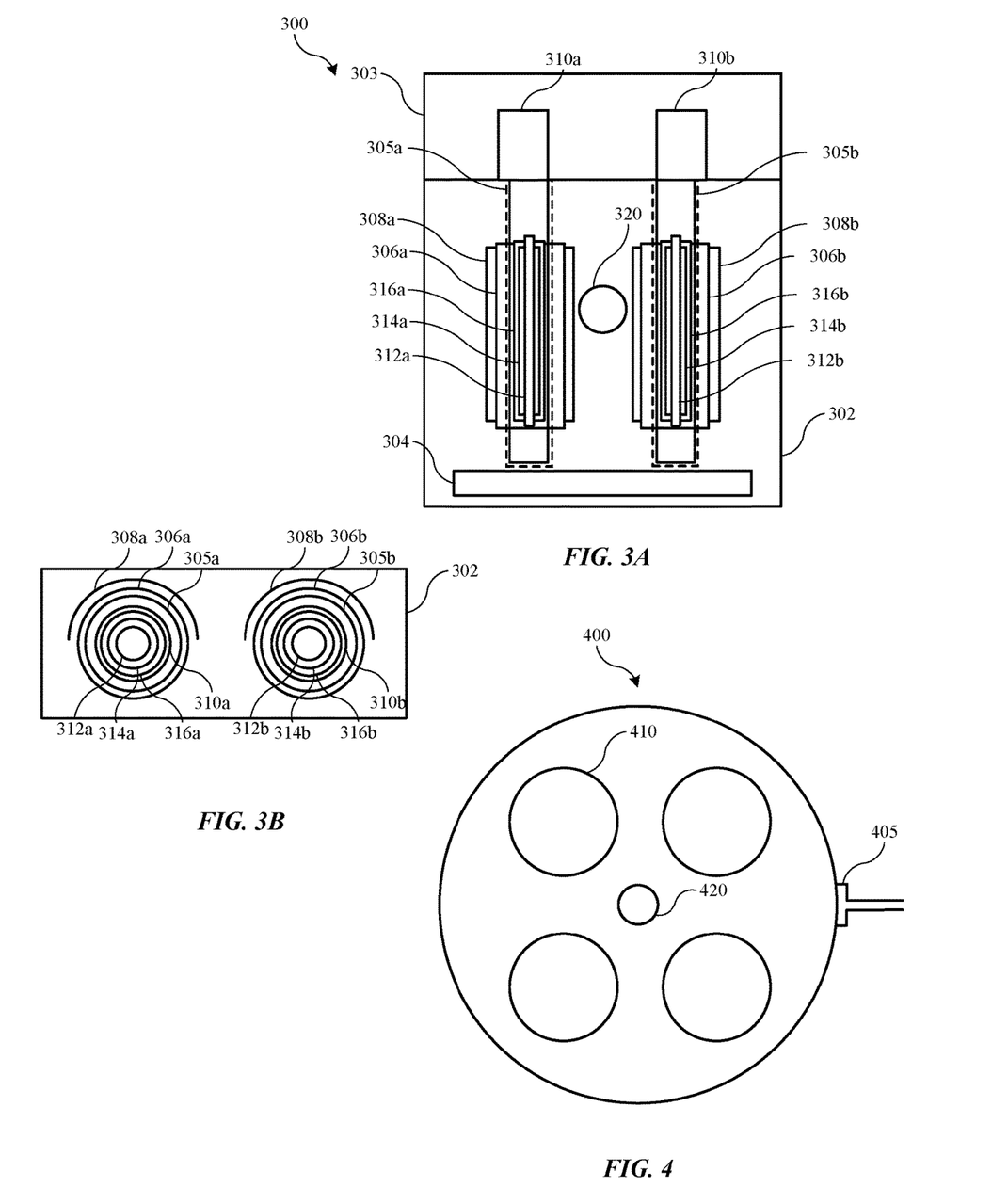
FIG. 3A shows a schematic cross-sectional view of an electronic apparatus according to some embodiments of the present technology.
FIG. 3B shows a schematic cross-sectional view of an electronic apparatus according to some embodiments of the present technology.
FIG. 4 shows a schematic top planar view of a wireless charger according to some embodiments of the present technology.

FIG. 3A shows a simplified schematic cross-sectional view of an electronic apparatus 300 according to some embodiments of the present technology. It is to be understood that electronic apparatus 300 is included merely to illustrate certain components according to some embodiments of the present technology, and is not intended to accurately represent either scale or position of components that may be incorporated in the apparatus. Electronic apparatus 300 may provide an exemplary cross-section of electronic apparatus 100 or components of wireless charging system 200, where electronic apparatus 300 may be earbuds or additional devices according to some embodiments of the present technology. For example, electronic apparatus 300 may include an enclosure 302 having a lid 303, and in which an enclosure battery 304 may be housed. Within enclosure 302 may be any number of additional components as discussed above, such as with enclosure 204, and which may include a processing unit providing or facilitating any of the functionality described throughout the present disclosure.

Battery 304 may be or include a rechargeable battery, including any number of rechargeable battery cells. Battery 304 may be a lithium-ion or other secondary battery type, and may be coupled with recharging circuitry and controllers operable to control charging and discharging operations. For example, battery 304 may be electrically coupled with wireless charging coils 306a and 306b, although in some embodiments only a single wireless charging coil may be incorporated within the system. The battery may be coupled with the coils via additional components or circuitry in some embodiments, which may include rectifiers, Buck units, or other components. Wireless charging coils 306 may receive wireless charging power from a power source as previously described, and may include circuitry for providing wireless power to recharge battery 304. As discussed above, a processing unit may facilitate these operations and any configurational aspects for operating wireless charging coils 306 in a wireless power receiving mode. In some embodiments, enclosure 302 may also optionally include one or more electromagnetic interference ("EMI") shields 308. For example, a first EMI shield 308a may at least partially extend about wireless charging coil 306a, and a second EMI shield 308b may at least partially extend about wireless charging coil 306b. The EMI shields may be made of a number of materials including aluminum, other metal materials, or magnetically conductive materials, such as ferrite or nanocrystalline materials.

Enclosure 302 may define one or more cavities 305, such as two cavities as illustrated, 305a, 305b, within which earbuds 310a, 310b may be seated. As illustrated, the wireless charging coils 306 may extend about the cavities 305, and may extend about the cylindrical portions of the cavities as previously described. Wireless charging coils 306 may be positioned in a number of locations in embodiments of the present technology. For example, wireless charging coils 306 may line the cavities 305, or may be embedded within the enclosure 302, while extending about the cavities as illustrated. Earbuds 310 may include any of the features or characteristics described previously. For example, earbuds 310 may include a battery 312 positioned within a stem of the earbud 310. A magnetic conductor material 314 may extend about the cavity, and may affect magnetic flux directed towards the earbuds in order to increase flux density received by wireless charging coils 316. Wireless charging coils 316 may be included within earbuds 310, and may operate to receive wireless power transmitted from a power source as previously described, as well as to receive wireless power transmitted from wireless charging coils 306 of enclosure 302. Electronic apparatus 300 may also include a magnet 320, which may be used to couple the apparatus with a wireless charger in some embodiments as will be further described below.

Earbud battery 312 may be or include a rechargeable battery, including any number of rechargeable battery cells. Battery 312 may also be a lithium-ion or other secondary battery type, and may be coupled with recharging circuitry and controllers operable to control charging and discharging operations, such as a processor within earbuds 310. For example, battery 312a may be electrically coupled with wireless charging coil 316a, and battery 312b may be electrically coupled with wireless charging coil 316b, which may individually charge the associated battery within each earbud. Again, the coils may be coupled with batteries via additional components as noted above. Wireless charging coils 316 may receive wireless charging power from a power source as previously described as well as from enclosure wireless charging coils 306 operating in a transmission mode, and coils 316 may include circuitry for providing wireless power to recharge batteries 312. As discussed above, a processing unit may facilitate these operations and any configurational aspects for operating wireless charging coils 316 in a wireless power receiving mode.

The enclosure wireless charging coils 306 and the earbud wireless charging coils 316 may operate separately in some embodiments, which may facilitate parallel charging of enclosure battery 304 with enclosure wireless charging coils 306, and earbud battery 312 with earbud wireless charging coils 316. Consequently, when electronic apparatus 300 is positioned on a wireless charger, for example, wireless power transmitted from the wireless charger may be received concurrently by both sets of wireless charging coils 306, 316, which may charge batteries 304, 312 in tandem. This operation of enclosure wireless charging coils 306 may be coordinated or controlled by an enclosure processor as previously described, and which may operate enclosure wireless charging coils 306 in a first mode of reception. Additionally, the enclosure processor may also operate the enclosure wireless charging coils 306 in a transmission mode to transmit wireless charging power to earbud wireless charging coils 316. Accordingly, when the electronic apparatus 300 may not be positioned near a power source, earbud wireless charging coils 316 may be operably coupled with enclosure wireless charging coils 306, and earbuds 310 may still receive wireless power from the enclosure for charging of earbud batteries 312.

FIG. 3B illustrates a cross-sectional view through electronic apparatus 300, which may further illustrate the arrangement of components in some embodiments of the present technology. The view may illustrate a portion of the apparatus, such as through stem portions of the earbuds 310 and cylindrical portions of cavities 305 as discussed above. As shown, a first earbud 310a may include a number of components housed within the stem portion of the earbud.

For example, the earbud 310a may include a first earbud battery 312a, which may be positioned in a stem portion or substantially cylindrical portion of earbud 310a. A first magnetic conductor 314a may at least partially extend about first earbud battery 312a within earbud 310a, and may be positioned between first earbud battery 312a and a first earbud wireless charging coil 316a also contained within the stem portion of first earbud 310a. As illustrated, the components may be concentrically aligned, or axially aligned, along a central axis through first earbud battery 312a, or through the stem portion of first earbud battery 310a. Similarly, second earbud 310b may include a second earbud battery 312b, a second magnetic conductor 314b, and a second earbud wireless charging coil 316b. These components may also be axially aligned about a central axis through second earbud battery 312b, or through the stem portion of second earbud 310b.

Extending radially outward from earbud 310a may be cavity 305a of enclosure 302, within which earbud 310a may be seated. Similarly, earbud 310b may be seated in cavity 305b of enclosure 302. Separate enclosure wireless charging coils 306 may extend about the cavities 305, which may provide close wireless coupling with the earbuds as will be described further below. Wireless charging coil 306a may extend concentrically about cavity 305a, and may be concentrically or axially aligned with earbud battery 312a, or the stem portion of earbud 310a. Wireless charging coil 306b may extend concentrically about cavity 305b, and may be concentrically or axially aligned with earbud battery 312b, or the stem portion of earbud 310b. EMI shields 308a and 308b may similarly extend about enclosure wireless charging coils 306, and may be axially aligned with the associated battery or earbud stem portion, although in some embodiments as illustrated, EMI shields 308 may not fully extend about the components. By including broken coverage with a gap, or two gaps as illustrated, eddy currents along the EMI shields may be minimized or reduced in some embodiments.

Magnetic conductor material 314 may be or include a ferrite material or a nanocrystalline foil. The magnetic conductor may be characterized by being non-conductive and ferromagnetic. Exemplary ferrite materials may include any material including iron, and may include soft ferrites or materials characterized as conductors of magnetic fields. Exemplary materials may include any number of additional elements including nickel, zinc, barium, or manganese, as non-limiting examples. In some embodiments, because many mobile and other electronic devices may be characterized by reduced form factors, ferrite may not provide adequate operational characteristics, as the ferrite may become thinner to accommodate device form factor restrictions. Accordingly, in some embodiments magnetic conductor material 314 may be or include a nanocrystalline foil, which may be or include ferrosilicon-containing material or other magnetic material in a layered or fractured material, and which may include adhesives or other polymer supports within the foil material. The foil may include any number of layers of ferrosilicon-containing material from a single layer, to two layers or more. Any other magnetic conducting materials may similarly be incorporated with some embodiments of the present technology.

FIG. 4 shows a schematic top planar view of a wireless charger 400 according to some embodiments of the present technology. Wireless charger 400 may be or include a power source, such as power source 205 as previously described, and may be used in some embodiments with electronic apparatuses described throughout the present disclosure. Wireless chargers compatible with the present technology may include any number of devices, including any device noted above. Although the wireless chargers may or may not include wired power coupling, wireless charger 400 may optionally include a wired connection 405 for access to mains power. Wireless charger 400 may include any number of components, but of note may include one or more wireless charging coils 410, which may include any of the features, materials, or characteristics of wireless charging coils described previously. Wireless charger 400 may include a ferrite, foil, or other magnetic conductor in some embodiments, and may also include a processor as previously described. Additionally, wireless charger 400 may include one or more hard magnets 420, which may allow coupling with an electronic apparatus to facilitate wireless charging and coil alignment.

Wireless charger 400 may include a single wireless charging coil 410, and in some embodiments may include two or more wireless charging coils, such as four or more wireless charging coils 410 as illustrated, six or more wireless charging coils, eight or more wireless charging coils, or more in some embodiments. The wireless charging coils may be distributed about a central axis of the wireless charger 400, and may be distributed about magnet 420 as illustrated. When multiple wireless charging coils are incorporated, the coils may be operated in cooperation to provide wireless charging power to one or more devices positioned on the wireless charger. A processor of the wireless charger may operate the coils to charge multiple components, which may facilitate wireless charging of electronic apparatuses such as previously described, and which may include a powered enclosure as well as powered devices.

Figure 5:
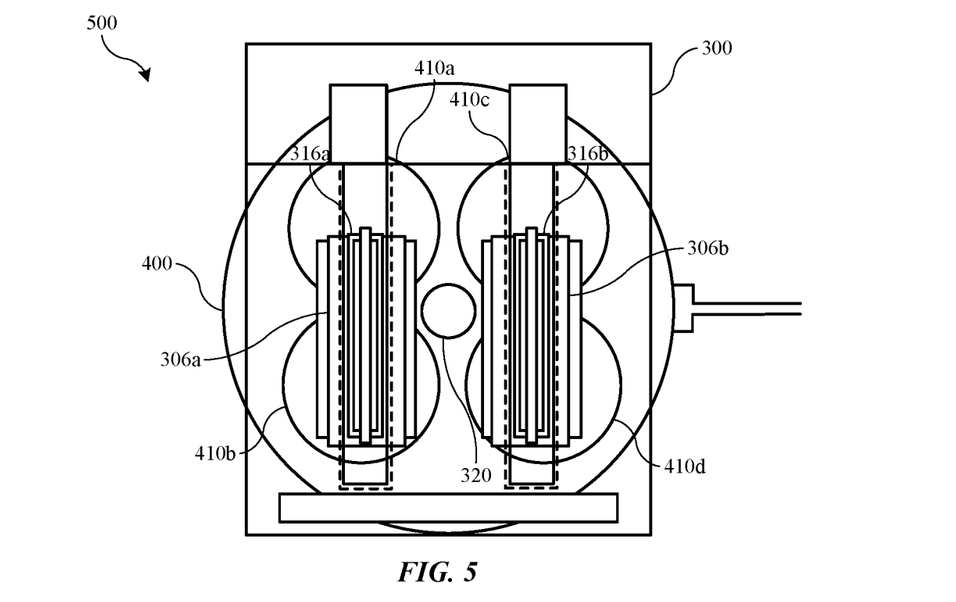
FIG. 5 shows an exemplary wireless charging system according to some embodiments of the present technology.

FIG. 5 shows a schematic cross-sectional view of a wireless charging system 500 according to some embodiments of the present technology. Wireless charging system 500 may include an electronic apparatus 300 as well as a wireless charger 400 as previously described. It is to be understood, however, that the description may similarly relate to or include any other device or system discussed throughout the present disclosure, or for which aspects of the present technology may be incorporated. FIG. 5 may illustrate the wireless charging system during a mode of operation of enclosure wireless charging coils 306 for which the enclosure wireless charging coils are receiving wireless power from wireless charger 400 to facilitate charging of an enclosure battery.

As illustrated, when electronic apparatus 300 is seated on wireless charger 400, magnet 320 of the electronic apparatus may engage with magnet 420 of the wireless charger 400. In some embodiments, the magnets may produce an alignment in some embodiments, which may position the earbuds as well as the wireless charging coils of the enclosure and the earbud across at least two of the wireless charger wireless charging coils 410. For example, the enclosure magnet and/or the wireless charger magnet may provide a rotational engagement in which the magnets may engage in one or more specific orientations. For example, in some embodiments as illustrated, where wireless charger 400 may include four wireless charging coils, the magnets may engage in one of four positions, which may orient or align the wireless charging coils at 90 degree intervals to ensure that the apparatus wireless charging coils extend across multiple wireless charging coils of the wireless charger.

One such alignment is illustrated in FIG. 5, where first enclosure wireless charging coil 306a, and axially aligned first earbud wireless charging coil 316a, may extend or be positioned across wireless charging coil 410a and wireless charging coil 410b of the wireless charger 400. Similarly, this alignment may position second enclosure wireless charging coil 306b, and axially aligned second earbud wireless charging coil 316b, across wireless charging coil 410c and wireless charging coil 410d of wireless charger 400. Each alignment may extend the electronic apparatus wireless charging coils across two or more adjacent wireless charging coils of the wireless charger, which may increase coupling to reduce or limit energy dispersal from misalignment. Accordingly, in some embodiments, the magnets may engage towards one or more alignments affording a maximum coupling between the system components. In operation, such as in an enclosure receiving operational mode, the wireless charger may be operated to transmit wireless power that is received by each wireless charging coil of the electronic apparatus, including first enclosure wireless charging coil 306a, second enclosure wireless charging coil 306b, first earbud wireless charging coil 316a, and second earbud wireless charging coil 316b.

Figure 6:
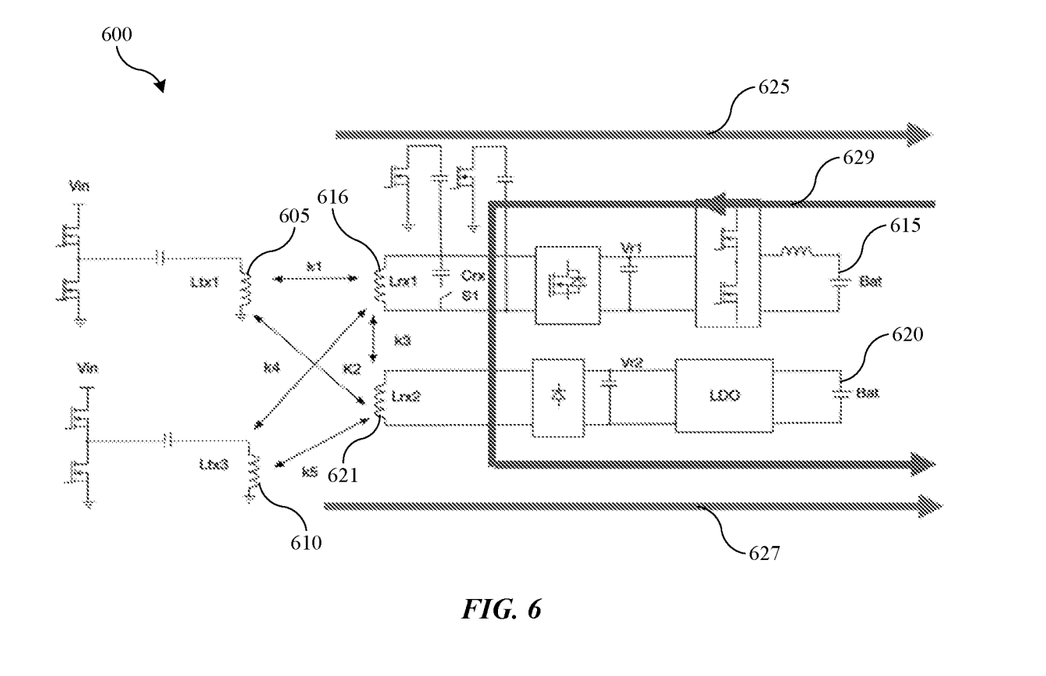
FIG. 6 shows exemplary circuitry of a portion of a wireless charging system according to some embodiments of the present technology.

FIG. 6 illustrates a wireless charging system 600 having exemplary circuitry according to some embodiments of the present technology, and may illustrate a portion of wireless charging system 500, such as with two wireless charger coils, and one earbud and enclosure section. For example, a wireless charger may include a first wireless charging coil 605, and a second wireless charging coil 610. Extending across these coils may be an earbud included within an enclosure. The image illustrates electronics 615 associated with an enclosure of a wireless apparatus, and electronics 620 associated with an earbud of a wireless apparatus. Electronics 615 associated with the enclosure may include materials configured to charge an enclosure battery, as well as operate wireless charging coils in both a transmission and a reception mode. Electronics 620 associated with the earbuds may include materials configured to charge the earbud batteries. The figure may illustrate portions of any component or system described throughout the present disclosure. The enclosure may include an enclosure wireless charging coil 616, and the earbud may include an earbud wireless charging coil 621. As described previously, magnets of the system may orient or align the components to extend the coils of the electronic apparatus across one or more coils of the wireless charger.

When two or more coils are utilized per earbud as illustrated, the wireless charger may operate the coils out of phase of one another to improve wireless power reception at both the enclosure wireless charging coil 616 and the earbud wireless charging coil 621. In some embodiments, the electronic apparatus may communicate orientation information with the wireless charger to improve such an out of phase operation. For example, referring back to FIG. 5, if the electronic apparatus 300 were oriented at a 90 degree rotation from what is illustrated, earbud wireless charging coil 316a and enclosure wireless charging coil 306a may then extend across charger wireless charging coils 410a and 410c, which may be operated out of phase from one another. This alignment may be communicated between the devices, or depending on the number of charger wireless charging coils, adjacent coils may be operated out of phase. For example, in some embodiments charger wireless charging coils 410a and 410c may be operated in phase with one another, and which may be on a 180 degree phase shift from wireless charging coils 410b and 410d. The extent of phase shift may be at least in part based on the number of wireless charging coils in the charger.

Wireless charging efficiency may be impacted by a number of factors including materials used, power levels, as well as a distance or gap between the wireless charging coils of the transmitting and receiving devices. Even small increases in gap distance may impact the efficiency of charging, which may be directly related to a coupling coefficient that is affected by gap distance. For example, coupling coefficients k1 and k5 may be at least partially based on a gap between the coils within the charger and the coils within the electronic apparatus. The present technology may axially align the enclosure wireless charging coil and the earbud wireless charging coil, which may produce a coupling between these two components, corresponding to coupling coefficient k3. Because in some embodiments the enclosure may include two wireless charging coils extending about the earbud cavities, coupling coefficient k3 may be greater than or about 0.8 for each earbud wireless charging coil and an associated enclosure wireless charging coil.

In some embodiments, coupling coefficient k3 may be greater than or about 0.85, greater than or about 0.9, greater than or about 0.91, greater than or about 0.92, greater than or about 0.93, greater than or about 0.94, greater than or about 0.95, greater than or about 0.96, greater than or about 0.97, greater than or about 0.98, greater than or about 0.99, or higher. Accordingly, due to high coupling, both electronic apparatus charging coils may receive wireless power from each of the charger wireless charging coils 605 and 610, as illustrated by corresponding coupling coefficients k4 and k5. By operating the charger coils out of phase, or on a 180 degree phase shift from one another, the charging efficiency may be maximized. Additionally, the high coupling may limit a voltage regulation between the enclosure and the earbuds, and reduce communication requirements across the system.

For example, systems according to embodiments of the present technology may improve charging of the earbuds, which may be charged by the power source when used, which may increase charging efficiency when the enclosure battery may be at reduced charge. When operating at reduced charge, a voltage provided by the enclosure may be below a charging voltage for the earbuds. Conventionally, a voltage boost may be incorporated to accommodate this situation, which may reduce the charging efficiency, and may increase charging times. Systems according to some embodiments of the present technology may overcome this scenario by affording parallel charging from the wireless charger. Cross regulation may also be improved by the high coupling between the wireless charging coils of the electronic apparatus, which may utilize a single feedback communication channel for voltage regulation. The enclosure may operate as a primary receiver, and the earbud wireless charging coils may operate as a subordinate receiver, as the voltage may track between the components due to the high coupling, independent of load. When the primary receiver, or enclosure wireless charging coils, are switched to transmission for providing wireless charging power to the earbuds, the enclosure may provide the appropriate voltage for the earbuds.

As illustrated, the electronics 615 for the enclosure may include a switch S1 positionable between an open and a closed setting. When wireless charging is being provided by a power source, switch S1 may be closed, and charging may occur for both the enclosure and the earbuds with energy flow separately to each component as illustrated by arrows 625 and 627. When the electronic apparatus is removed from the wireless charger, switch S1 may be opened, and the enclosure wireless charging coils may operate in a transmission mode to wirelessly charge the earbuds, and energy may flow along arrow 629. By utilizing systems according to some embodiments of the present technology, parallel wireless charging of earbud batteries and an earbud enclosure battery may increase charging efficiency of the apparatus. Additionally, charging systems according to some embodiments of the present technology may include a charger having multiple charging coils operated to efficiently provide power to all associated wireless charging coils of the enclosure and the earbuds.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the layer" includes reference to one or more layers and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. An electronic apparatus comprising:
   an enclosure having a lid, wherein the enclosure defines a first cavity and a second cavity within the enclosure, and wherein the enclosure includes an enclosure battery;
   a first enclosure wireless charging coil incorporated within the enclosure and extending around the first cavity;
   a second enclosure wireless charging coil incorporated within the enclosure and extending around the second cavity;
   a first earbud positionable within the first cavity of the enclosure, the first earbud comprising a first earbud battery and a first earbud wireless charging coil operably coupleable with the first enclosure wireless charging coil for wireless charging of the first earbud battery; and
   a second earbud positionable within the second cavity of the enclosure, the second earbud comprising a second earbud battery and a second earbud wireless charging coil operably coupleable with the second enclosure wireless charging coil for wireless charging of the second earbud battery.

2. The electronic apparatus of claim 1, wherein the first enclosure wireless charging coil and the second enclosure wireless charging coil are switchable between a first operational mode of wireless power reception, and a second operational mode of wireless power transmission.

3. The electronic apparatus of claim 1, wherein the first earbud includes a profile having a substantially cylindrical portion within which the first earbud battery is disposed, wherein the first earbud wireless charging coil extends concentrically about the first earbud battery, wherein the second earbud includes a profile having a substantially cylindrical portion within which the second earbud battery is disposed, and wherein the second earbud wireless charging coil extends concentrically about the second earbud battery.

4. The electronic apparatus of claim 3, further comprising:
   a first magnetic conductor positioned between the first earbud battery and the first earbud wireless charging coil, and
   a second magnetic conductor positioned between the second earbud battery and the second earbud wireless charging coil.

5. The electronic apparatus of claim 3, wherein, when the first earbud is positioned within the first cavity of the enclosure, the first enclosure wireless charging coil extends concentrically about the first earbud wireless charging coil.

6. The electronic apparatus of claim 1, further comprising:
   a first electromagnetic interference ("EMI") shield within the enclosure and at least partially extending around the first enclosure wireless charging coil, and
   a second EMI shield within the enclosure and at least partially extending around the second enclosure wireless charging coil.

7. A wireless charging system comprising:
   a wireless charger comprising a charger wireless charging coil; and
   an electronic apparatus comprising:
      an enclosure defining a first cavity and a second cavity within the enclosure, wherein the enclosure includes an enclosure battery;
      a first enclosure wireless charging coil incorporated within the enclosure and extending around the first cavity;
      a second enclosure wireless charging coil incorporated within the enclosure and extending around the second cavity, wherein the first enclosure wireless charging coil and the second enclosure wireless charging coil are electrically coupled with the enclosure battery;
      a first earbud positionable within the first cavity of the enclosure, the first earbud comprising a first earbud battery and a first earbud wireless charging coil operably coupleable with the first enclosure wireless charging coil for wireless charging; and
      a second earbud positionable within the second cavity of the enclosure, the second earbud comprising a second earbud battery and a second earbud wireless charging coil operably coupleable with the second enclosure wireless charging coil for wireless charging.

8. The wireless charging system of claim 7, wherein the wireless charger comprises four charger wireless charging coils positioned about a central axis of the wireless charger.

9. The wireless charging system of claim 8, wherein a first charger wireless charging coil and a second charger wireless charging coil are configured to transmit wireless power in 180° phase shift from one another.

10. The wireless charging system of claim 8, wherein, when seated on the wireless charger, the enclosure produces an alignment positioning the first enclosure wireless charging coil and the first earbud across a first charger wireless charging coil and a second wireless charging coil, and positioning the second enclosure wireless charging coil and the second earbud across a third charger wireless charging coil and a fourth wireless charging coil.

11. The wireless charging system of claim 10, wherein the wireless charger further comprises a magnet, wherein the enclosure further comprises a magnet, and wherein the magnet of the wireless charger and the magnet of the enclosure cooperate to provide the alignment.

12. The wireless charging system of claim 7, wherein the wireless charger is operable to transmit wireless power receivable by the first enclosure wireless charging coil, the second enclosure wireless charging coil, the first earbud wireless charging coil, and the second earbud wireless charging coil.

13. The wireless charging system of claim 7, wherein the first enclosure wireless charging coil and the second enclosure wireless charging coil are switchable between a first operational mode of wireless power reception, and a second operational mode of wireless power transmission.

14. The wireless charging system of claim 7, wherein the first earbud includes a profile having a substantially cylindrical portion within which the first earbud battery is disposed, wherein the first earbud wireless charging coil extends concentrically about the first earbud battery, wherein the second earbud includes a profile having a substantially cylindrical portion within which the second earbud battery is disposed, and wherein the second earbud wireless charging coil extends concentrically about the second earbud battery.

15. The wireless charging system of claim 14, further comprising:
   a first magnetic conductor positioned between the first earbud battery and the first earbud wireless charging coil, and a second magnetic conductor positioned between the second earbud battery and the second earbud wireless charging coil.

16. The wireless charging system of claim 14, wherein, when the first earbud is positioned within the first cavity of the enclosure, the first enclosure wireless charging coil extends concentrically about the first earbud wireless charging coil.

17. The wireless charging system of claim 7, further comprising:
   a first electromagnetic interference ("EMI") shield within the enclosure and at least partially extending around the first enclosure wireless charging coil, and
   a second EMI shield within the enclosure and at least partially extending around the second enclosure wireless charging coil.

18. An electronic apparatus comprising:
   an enclosure defining a first cavity and a second cavity within the enclosure, wherein the enclosure includes an enclosure battery;
   an enclosure wireless charging coil incorporated within the enclosure and extending around the first cavity, wherein the enclosure wireless charging coil is electrically coupled with the enclosure battery;
   a first earbud positionable within the first cavity of the enclosure, the first earbud comprising:
      a first earbud battery, and
      a first earbud wireless charging coil extending concentrically about the first earbud battery, wherein the first earbud wireless charging coil is operably coupleable with the enclosure wireless charging coil for wireless charging; and
   a second earbud positionable within the second cavity of the enclosure, the second earbud comprising a second earbud battery and a second earbud wireless charging coil.

19. The electronic apparatus of claim 18, wherein the enclosure wireless charging coil is switchable between a first operational mode of wireless power reception, and a second operational mode of wireless power transmission.

20. The electronic apparatus of claim 18, further comprising:
   a first magnetic conductor axially aligned with and positioned between the first earbud battery and the first earbud wireless charging coil, and
   a second magnetic conductor axially aligned with and positioned between the second earbud battery and the second earbud wireless charging coil.

* * * * *